United States Patent
Pathier

(10) Patent No.: US 10,466,088 B2
(45) Date of Patent: Nov. 5, 2019

(54) FLOW METER USED FOR METERING THE ENERGY APPLIED TO A METHOD EMPLOYING A CRYOGENIC FLUID

(71) Applicant: L'Air Liquide, Societe Anonyme pour l'Etude et l'Exploitation des Procedes Georges Claude, Paris (FR)

(72) Inventor: Didier Pathier, Voisins Bretonneux (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 346 days.

(21) Appl. No.: 15/329,815

(22) PCT Filed: Jul. 21, 2015

(86) PCT No.: PCT/FR2015/052007
§ 371 (c)(1),
(2) Date: Jan. 27, 2017

(87) PCT Pub. No.: WO2016/016546
PCT Pub. Date: Feb. 4, 2016

(65) Prior Publication Data
US 2018/0340810 A1    Nov. 29, 2018

(30) Foreign Application Priority Data
Jul. 29, 2014   (FR) ...................................... 14 57345

(51) Int. Cl.
*G01F 15/08* (2006.01)
*G01K 7/06* (2006.01)
*F25B 19/00* (2006.01)

(52) U.S. Cl.
CPC ............ *G01F 15/08* (2013.01); *F25B 19/005* (2013.01); *G01K 7/06* (2013.01); *F25B 2400/23* (2013.01)

(58) Field of Classification Search
CPC .... G01F 15/08; F25B 19/005; F25B 2400/23; A23G 3/26; A23P 20/15; A23P 20/18
See application file for complete search history.

(56) References Cited

U.S. PATENT DOCUMENTS

| | | | |
|---|---|---|---|
| 6,228,172 B1 * | 5/2001 | Taylor | A23G 3/26 118/19 |
| 7,013,740 B2 * | 3/2006 | Dutton | G01F 1/74 73/861.354 |
| 2004/0221660 A1 | 11/2004 | Dutton et al. | |

FOREIGN PATENT DOCUMENTS

| | | |
|---|---|---|
| EP | 0 667 510 | 8/1995 |
| EP | 0 923 883 | 6/1999 |
| FR | 3 000 199 | 6/2014 |
| GB | 1 208 121 | 10/1970 |
| WO | WO 02/057697 | 7/2002 |

OTHER PUBLICATIONS

International Search Report and Written Opinion for PCT/FR2015/052007, dated Nov. 11, 2015.
French Search Report and Written Opinion for FR 1 457 345, dated Apr. 9, 2015.

* cited by examiner

*Primary Examiner* — Justin N Olamit
(74) *Attorney, Agent, or Firm* — Christopher J. Cronin

(57) ABSTRACT

A method of metering the energy applied to a downstream process employing a cryogenic fluid, comprising the following steps: a) separating the liquid and gas phases of the cryogenic fluid before the cryogenic fluid reaches the downstream user process. b) Measuring the mass flow rate of the gas phase. c) Calculating the energy flow rate associated with this gas flow rate by taking into consideration the variation in enthalpy of the gas between its vaporization temperature and the gas temperature recorded at the outlet of said downstream process in real time. d) Measuring the mass flow rate of the liquid phase, e) Calculating the energy flow rate associated with this liquid flow rate taking into consideration the temperature of the liquid and the vaporization energy of the liquid cryogen at this temperature, and taking into consideration in the case of the gas resulting from the vaporization of this liquid, the variation in enthalpy of this gas between its vaporization temperature and the temperature of the gas at the outlet of said downstream process in real time. f) (Re)combining the two, liquid and gas, phases of the fluid in order to allow it as this combination to be fed to said downstream user process.

1 Claim, 3 Drawing Sheets

| State of the liquid nitrogen in the tank | Equilibrium pressure (barg) | Equilibrium temperature (°C) | Density (kg/m$^3$) | Cold absorbed by vaporization (kJ/kg) |
|---|---|---|---|---|
| Liquid nitrogen that has just been delivered (so-called "cold" nitrogen) | 0.5 | -192 | 790 | 192 |
| Liquid nitrogen at equilibrium at 2 bar (so-called "hot" nitrogen at the end of the tank at 2 bar) | 2 | -185 | 756 (-4%) | 177 (-8%) |
| Liquid nitrogen at equilibrium at 4 bar (so-called "hot" nitrogen at the end of the tank at 4 bar) | 4 | -179 | 724 (-8%) | 164 (-15%) |

Figure 1

| Pressure (barg) | Vaporization temperature (°C) | Temperature of the gas at the outlet of the deep freezing process (°C) | Total energy available (J/kg) |
|---|---|---|---|
| 1 | -189.52 | -150 | 44.983 |
| 1 | -189.52 | -100 | 97.443 |
| 1 | -189.52 | -50 | 149.633 |
| 1 | -189.52 | 0 | 201.723 |
| 2 | -185.24 | -150 | 42.541 |
| 2 | -185.24 | -100 | 95.001 |
| 2 | -185.24 | -50 | 147.191 |
| 2 | -185.24 | 0 | 199.281 |
| 3 | -181.92 | -150 | 40.996 |
| 3 | -181.92 | -100 | 93.456 |
| 3 | -181.92 | -50 | 145.646 |
| 3 | -181.92 | 0 | 197.736 |
| 4 | -179.15 | -150 | 39.977 |
| 4 | -179.15 | -100 | 92.437 |
| 4 | -179.15 | -50 | 144.627 |
| 4 | -179.15 | 0 | 196.717 |
| 5 | -176.77 | -150 | 39.313 |
| 5 | -176.77 | -100 | 91.773 |
| 5 | -176.77 | -50 | 143.963 |
| 5 | -176.77 | 0 | 196.053 |
| 6 | -174.66 | -150 | 38.908 |
| 6 | -174.66 | -100 | 91.368 |
| 6 | -174.66 | -50 | 143.558 |
| 6 | -174.66 | 0 | 195.648 |

Figure 2

| Pressure (barg) | Vaporization temperature (°C) | Temperature of the gas at the outlet of the deep freezing process (°C) | Energy of vaporization available (J/kg) | Energy available in the gas (J/kg) | Total energy available (J/kg) |
|---|---|---|---|---|---|
| 1 | -189.52 | -150 | 190.577 | 44.983 | 235.54 |
| 1 | -189.52 | -100 | 190.577 | 97.443 | 288 |
| 1 | -189.52 | -50 | 190.577 | 149.633 | 340.19 |
| 1 | -189.52 | 0 | 190.577 | 201.723 | 392.28 |
| 2 | -185.24 | -150 | 183.959 | 42.541 | 226.5 |
| 2 | -185.24 | -100 | 183.959 | 95.001 | 278.96 |
| 2 | -185.24 | -50 | 183.959 | 147.191 | 331.15 |
| 2 | -185.24 | 0 | 183.959 | 199.281 | 383.24 |
| 3 | -181.92 | -150 | 178.354 | 40.996 | 219.35 |
| 3 | -181.92 | -100 | 178.354 | 93.456 | 271.81 |
| 3 | -181.92 | -50 | 178.354 | 145.646 | 324 |
| 3 | -181.92 | 0 | 178.354 | 197.736 | 376.09 |
| 4 | -179.15 | -150 | 173.323 | 39.977 | 213.3 |
| 4 | -179.15 | -100 | 173.323 | 92.437 | 265.76 |
| 4 | -179.15 | -50 | 173.323 | 144.627 | 317.95 |
| 4 | -179.15 | 0 | 173.323 | 196.717 | 370.04 |
| 5 | -176.77 | -150 | 168.677 | 39.313 | 207.98 |
| 5 | -176.77 | -100 | 168.677 | 91.773 | 260.44 |
| 5 | -176.77 | -50 | 168.677 | 143.963 | 312.63 |
| 5 | -176.77 | 0 | 168.677 | 196.053 | 364.72 |
| 6 | -174.66 | -150 | 164.277 | 38.908 | 203.175 |
| 6 | -174.66 | -100 | 164.277 | 91.368 | 255.645 |
| 6 | -174.66 | -50 | 164.277 | 143.558 | 307.835 |
| 6 | -174.66 | 0 | 164.277 | 195.648 | 359.925 |

Figure 3

FLOW METER USED FOR METERING THE ENERGY APPLIED TO A METHOD EMPLOYING A CRYOGENIC FLUID

CROSS-REFERENCE TO RELATED APPLICATIONS

This application is a § 371 of International PCT Application PCT/FR2015/052007, filed Jul. 21, 2015, which claims § 119(a) foreign priority to French patent application FR 1457345, filed Jul. 29, 2014.

BACKGROUND

Field of the Invention

The present invention is concerned with methods employing a cryogenic fluid such as liquid nitrogen as a source of cold. In this technical field mention may be made of the example of the deep-freezing of food products or alternatively of the coating of such food products in a churn by a cryogenic route, although fields other than the foodstuff industry employ a cryogen to cool products or components (mechanical or the like).

Related Art

Further, it is known that, in such processes, the amount of cold supplied to the process via an injection of a cryogen, liquid nitrogen for example, is a critical parameter in the process. If too much cold or too little cold is supplied to the process, the product obtained will not meet the specification set at the outset.

For example, in the case of the cryogenic coating of food products, too great a supply of cold causes the coating product (for example a sauce) to separate and it is then found in the form of a powder at the end of the cycle whereas the desire had been to cause it to adhere to the surface of the pieces that were to be coated. When that happens, the finished product does not have a sufficient dose of sauce on the surface and does not meet the manufacturing specification. Conversely, an insufficient supply of cold causes the products that are to be coated to set solid, and this is clearly not the intended outcome. When that happens, the product is lost.

It can therefore be seen, from reading the foregoing, that control over the quantity of cold (or energy) supplied to the user process is a key criterion in controlling and succeeding with this type of cryogen user process.

The present invention is therefore also concerned with the field of flow meters for gas/liquid biphasic fluids.

Measuring the flow rate of a biphasic fluid made up of a liquid and of a gas is a difficult operation when it is a mass flow rate that is to be measured. Specifically, all flow rate measuring sensors are hampered when faced with a biphasic fluid the density of which is forever changing.

This is particularly true of the measurement of the flow rate of cryogenic fluids such as liquid nitrogen.

Let us in what follows consider the example of liquid nitrogen as a source of cold, although the phenomena listed below may also apply to other refrigerating fluids such as $CO_2$, helium, etc.

One simple and very widespread cryogenic method for injecting a given quantity of cold into a process is to inject the cryogen, for example liquid nitrogen, through a calibrated orifice of which the flow rate under given conditions of biphasic content, pressure and temperature of the liquid nitrogen are precisely known. Thus, if the supply of liquid nitrogen remains under the same conditions, there is a simple rule that can be used to link the amount of cold injected to the injection time. When the injection time is doubled, the amount of cold injected is doubled.

However, it has been found in practice that this system becomes very imprecise when the liquid nitrogen state parameters change, which is what they do in industrial applications. This is particularly true when the biphasic content changes.

It is of course possible to correct the system by eliminating the gas phase using a phase separator upstream of the injection point.

When this system is additionally provided with pressure regulation, a marked improvement of the precision of the system is then noted, although it is still insufficient for certain processes. Specifically, when the temperature of the liquid nitrogen changes, the density of the liquid and the amount of cold associated with the injection of a given volume of liquid nitrogen changes. The table attached as FIG. 1 hereinafter shows three typical cases of the state of the liquid nitrogen in representative industrial processes.

It is found that when the liquid nitrogen is not as cold (−179° C.), it supplies less cold (164 kJ/kg) and is less dense, and this has the effect of increasing the flow rate passing through the calibrated orifice and in part compensates for the lower quantity of cold supplied (the nitrogen supplies less cold but the flow rate of the calibrated orifice is greater). Overall, it is found that the balance of these two elements acting in opposite directions is not zero.

When the equilibrium pressure increases from 0.5 to 4 bar (the difference between so-called "cold" nitrogen and so-called "hot" nitrogen at 4 bar), the density of the liquid nitrogen decreases by 8%, and its flow rate through an orifice increases by 4% even though the cold supplied decreases by 15%. The net result is therefore negative (−11.5%).

Likewise, when the equilibrium pressure rises from 0.5 bar to 2 bar (the difference between so-called "cold" nitrogen and so-called "hot" nitrogen at 2 bar), the net result is −6%.

By way of comparison, a system injecting liquid nitrogen without any pressure regulation or any phase separator may lead to metering errors in excess of 50%. Separating out the gas phase by means of a separator and regulating the pressure therefore does allow a very marked improvement in the precision of the metering. However, note here the limits of a calibrated-orifice system with pressure regulation and a phase separator which, while admittedly affording a certain degree of improvement, still proves to be insufficient in certain cases.

In order to get around the variation in temperature of the liquid nitrogen at the point of injection it is then possible to supercool the fluid. To do that it is possible for example to use an in-line subcooler (system installed in series on the liquid nitrogen piping connecting the storage to the injection point) or to subcool the liquid nitrogen in the storage tank. For the latter option, the pressure therefore needs to drop uniformly in order to subcool the fluid in the tank (for example once a day) and then rise again so that the injection point can be supplied with a sufficient and constant pressure.

In that case, the system becomes precise when operating at steady state. Under transient conditions (at the start of production or when production is resumed after a stoppage), the liquid nitrogen at physical conditions that are well defined at tank level may arrive at the injection point under different conditions. Specifically, the piping connecting the tank and the injection point may significantly modify the temperature of the nitrogen on startup when it is not yet at its stabilized temperature.

This system is therefore satisfactory on the whole but does nevertheless have a sticking point as to its use: it is expensive to set up because it requires the installation of a phase separator or, quite often, the installation of two tanks (one at low pressure and one at the usage pressure).

In addition, when the parameters of the process employing the liquid nitrogen vary (for example when the temperature of the food products that are to be cooled by the injection of liquid nitrogen changes), the amount of energy contained in a given mass of nitrogen varies. Specifically, if the parameters of the process employing the liquid nitrogen vary then quite often the thermal efficiency achieved when the nitrogen is injected likewise varies. In consequence, in order to obtain a determined and constant thermal effect with a different efficiency, the quantity injected needs to be altered to compensate for the fluctuations in efficiency of the cooling process.

Aside from the abovementioned method employing a calibrated orifice, another method has been proposed in the literature and to learn about this reference may be made to document EP 923 883 which relates to the application of a coating to food products, the principle of the method being summarized as follows:

the quantity of food product to be cooled is measured;
the mass of cryogenic fluid needed for the process, i.e. needed to obtain a reference temperature for the products (for example to lower the product temperature from a temperature T1 to a temperature T2) is calculated;
the considered mass of cryogenic liquid is introduced (the mass of cryogenic fluid is measured);
a predetermined mass of coating product is applied to the products to create the required coating on these products.

Although the document supplies little detail regarding the methods of calculation, it may be considered that it intends to calculate the energy needed to obtain the reference temperature for the products and that it converts this energy into the mass of cryogen needed, using a mean coefficient that is fixed and determined once and for all and cannot be varied according to the parameters of the deep-freezing and coating process.

By comparison with the previous method, this technical solution admittedly offers an improvement in the precision and repeatability of the result of the evaluation. However, it does have a weakness.

Specifically, the system calculates a mass of cryogenic fluid to be injected on the basis of a fixed ratio between the mass of liquid nitrogen and the associated supply of energy. In reality, it is often the case in industrial processes that this energy ratio can vary with the temperature of the liquid nitrogen entering the system and also with the parameters of the process for cooling the food products. With an exact measurement of the mass of liquid nitrogen injected, deviations in the user processes are therefore found which are due to deviations in these thermal efficiencies of the cryogenic fluid.

Thus, this solution may prove to be insufficiently precise in the following instances:

when the liquid nitrogen supply pressure varies. When that happens, the system meters a mass of liquid nitrogen but the amount of energy available per unit mass varies (see the table previously introduced as FIG. 1, which gives the variation in energy of vaporization as a function of equilibrium pressure);
when the temperature of the cryogen varies, the amount of energy available per unit volume of liquid nitrogen varies. This variation is not taken into consideration by this technical solution;
the document also specifies that an intermediate reservoir may be used for metering (weighing) the mass of cryogenic fluid supplied to the process. This technique is precise only when the cryogenic fluid is injected into the downstream user process (for example a churn) just after it has been metered. Specifically when the liquid nitrogen is kept in a reservoir, even if it is very well thermally insulated, over time the fluid loses its refrigerating properties. Therefore, if the fluid is metered too far ahead of being injected, the amount of cold injected will be lower than the desired amount.

SUMMARY OF THE INVENTION

It is an object of the present invention to alleviate the aforementioned disadvantages and the present invention to this end seeks to offer a new solution for precise measurement of the quantity of energy supplied by a biphasic cryogen to a downstream process employing this cryogen.

As will be seen in greater detail in what follows, the present invention proposes taking the following steps:

the gas and liquid phases of the cryogenic fluid are separated before the cryogenic fluid arrives in the downstream user process;
the mass flow rate of the gas phase is measured (by taking a direct mass measurement or a volume measurement that is corrected by taking into consideration the pressure and the temperature of the gas which is something known per se to those skilled in the art);
the energy flow rate associated with this gas flow rate is calculated taking into consideration the variation in enthalpy of the gas between its vaporization temperature and the gas temperature at the outlet of said downstream process employing cooling (for example the cooling of food products) in real time;
the mass flow rate of the liquid phase is measured (by taking a direct mass measurement or a volume measurement that is corrected by taking into consideration the density which, again, is something known per se to those skilled in the art);
the energy flow rate associated with this liquid flow rate is calculated taking into consideration the temperature of the liquid and the energy of vaporization of the liquid cryogen at this temperature. Considering that this liquid will be completely vaporized, for this vaporized gas the calculation also takes into consideration the variation in enthalpy of this gas between its vaporization temperature and the temperature of the gas at the outlet of the downstream cooling process (like with the gas phase mentioned hereinabove);
the two phases are (re)combined to allow this mixture to go on and supply the downstream user process.

For a further understanding of the nature and objects for the present invention, reference should be made to the detailed description, taken in conjunction with the accompanying drawing, in which like elements are given the same or analogous reference numbers and wherein:

BRIEF DESCRIPTION OF THE FIGURES

FIG. 1 is a table of the typical physical properties of liquid nitrogen as used in various industrial processes.

FIG. 2 is a table for calculating the energy of gaseous nitrogen in the case of a downstream freezing process.

FIG. 3 is a table for calculating the energy of liquid nitrogen in the case of a downstream freezing process.

DETAILED DESCRIPTION OF THE INVENTION

In other words, and unlike the indications in the above prior art, in the case of the present invention, the calculations associated with measuring the flow rate of cryogenic liquid take into consideration the temperature, pressure and ratio between the gas phase and the liquid phase of the liquid nitrogen, the calculations also taking account of the temperature of the downstream usage (for example of deep freezing food products). Thanks to all these parameters, the system may associate an energy value and a cooling efficiency with a mass of liquid nitrogen.

It can therefore measure and meter very precisely the supply of energy of the liquid nitrogen circulating through the system (rather than the supply of liquid nitrogen by mass).

The foregoing has used liquid nitrogen as a concrete example, although it has already been pointed out that this entire description applies equally to other cooling cryogens such as $CO_2$.

In this way, a very precise measurement of the quantity of energy supplied by the gas and liquid phases of the cryogen is obtained. Unlike the solutions of the prior art, this measurement remains correct even when the pressure, the temperature and the biphasic content of the fluid vary, whether or not the liquid nitrogen is subcooled.

As has been stated, another important factor is that the temperature of the cryogen is taken into consideration here. With the solutions of the prior art, the temperature of the cryogen is not taken into consideration. In many instances, this temperature is constant and has no influence on the precision of the measurement. However, when the temperature of the cryogen varies then the quantity of energy supplied by a given mass of liquid nitrogen under given pressure and temperature conditions likewise varies. If the temperature of the cryogen decreases, the amount of energy available in the liquid nitrogen will automatically be greater.

The system proposed here takes account of the temperature of the cryogen and of this phenomenon. Thus, the measurement of the energy supplied remains correct even when the temperature varies.

In other words, according to the present invention:
the mass flow rate of the gas phase is taken (whether by direct measurement or alternatively by converting a volumetric flow rate);
this mass flow rate is converted into energy using tables and taking into account the variation in enthalpy of the gas between its vaporization temperature and the temperature of the gas at the outlet of the user cooling process in real time (attached FIG. 2 provides an example of a table for calculating the energy of the gaseous nitrogen in the case of a downstream process which is a deep freezing process);
the mass flow rate of the liquid phase is taken (whether by direct measurement or alternatively by converting a volumetric flow rate);
this mass flow rate is converted into energy using tables and taking into consideration the temperature of the liquid and the energy of vaporization of liquid nitrogen at this temperature, and the variation in enthalpy of the gas resulting from the vaporization of this liquid between its vaporization temperature and the temperature of the gas at the outlet of the downstream user cooling process in real time (attached FIG. 3 provides an example of a table for calculating the energy of the liquid nitrogen in the case of a downstream process which is a deep freezing process).

The present invention therefore relates to a method for metering the energy supplied to a downstream process employing a cryogenic fluid, comprising the following steps:

a) the gas and liquid phases of the cryogenic fluid are separated before the cryogenic fluid arrives in the downstream user process;

b) the mass flow rate of the gas phase is measured;

c) the energy flow rate associated with this gas flow rate is calculated taking into consideration the variation in enthalpy of the gas between its vaporization temperature and the gas temperature recorded at the outlet of said downstream process in real time;

d) the mass flow rate of the liquid phase is measured;

e) the energy flow rate associated with this liquid flow rate is calculated taking into consideration the temperature of the liquid and the energy of vaporization of the liquid cryogen at this temperature, and taking into consideration, for the gas resulting from the vaporization of this liquid, the variation in enthalpy of this gas between its vaporization temperature and the temperature of the gas at the outlet of said downstream process in real time;

f) the two, liquid and gas, phases of the fluid are (re) combined to allow the fluid to go on and supply said downstream user process with this mixture.

The present invention also relates to a flow meter for cryogenic liquid/gas biphasic fluids, able to measure the energy supplied by the cryogenic fluid passing through the flow meter to supply a downstream process employing this cryogenic fluid, comprising:
a phase separator able to separate the gas and liquid phases of the cryogenic fluid arriving at the flow meter;
a gas flow rate sensor able to measure the mass flow rate of the separated gas phase;
a liquid flow rate sensor able to measure the mass flow rate of the separated liquid phase;
a data acquisition and processing unit able:
to calculate the energy flow rate associated with the gas flow rate measured by said gas flow rate sensor, taking into consideration the variation in enthalpy of the gas between its vaporization temperature and the gas temperature recorded at the outlet of said downstream process in real time, and
to calculate the energy flow rate associated with the liquid flow rate measured by said liquid flow rate sensor, taking into consideration the temperature of the liquid and the energy of vaporization of the liquid cryogen at this temperature and taking into consideration, for the gas resulting from the vaporization of this liquid, the variation in enthalpy of this gas between its vaporization temperature and the temperature of the gas at the outlet of said downstream process in real time,
and to deduce the energy supplied by the cryogenic fluid passing through the flow meter as being the sum of the two aforementioned energy flow rates;
means allowing the two, liquid and gas, phases of the fluid to be (re)combined.

Tests conducted by the applicant company using a system (method and flow meter) according to the invention for measuring an energy flow rate of liquid nitrogen supplying a downstream user process have demonstrated that it was possible to obtain a precise measurement of the energy flow rate whatever the biphasic content of the fluid, the pressure thereof, the temperature thereof, whether or not the fluid is subcooled.

Further, these tests also demonstrated that the energy measurement made according to the invention allowed the use, in an overall approach to controlling/regulating the downstream user process, of:

consideration of an energy setpoint (requirement for cold) needed by the user process;

measurement of the energy supplied by the fluid by virtue of the invention;

feedback action on the cryogen injection means in the process in order to keep the energy at the setpoint level.

This proved to be entirely advantageous in the case of a user process operating in cycles with requirements for cold that varied from one cycle to another, with liquid nitrogen characteristics that may (and inevitably will) vary from one cycle to another, the proposed system then making it possible to maintain complete control over the conditions under which the downstream user process is supplied, something that was not the case with the prior art techniques mentioned above.

As will have been appreciated from reading the foregoing, while the invention has been very specifically explained and exemplified hereinabove in the case of liquid nitrogen, it can be applied to other refrigerating fluids and notably $CO_2$.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context dearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of": "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for regulating cooling energy supplied to a downstream process employing a cryogenic fluid according to a setpoint amount of cooling energy needed for the downstream process, comprising the following steps:

separating gas and liquid phases of the cryogenic fluid before the cryogenic fluid arrives in the downstream process;

measuring a mass flow rate of the gas phase;

calculating an energy flow rate associated with the measured gas phase mass flow rate taking into consideration a variation in enthalpy of the gas phase between a vaporization temperature of the gas phase and a gas temperature recorded at an outlet of said downstream process in real time;

measuring a mass flow rate of the liquid phase;

calculating an energy flow rate associated with the measured liquid phase mass flow rate taking into consideration:

a temperature of the liquid phase and the energy of vaporization of the liquid phase at this temperature, and for gas resulting from vaporization of the liquid phase, a variation in enthalpy of this gas between a vaporization temperature at which vaporization occurred and the gas temperature recorded at the outlet;

combining the liquid and gas phases of the cryogenic fluid;

supplying the combined liquid and gas phases of the cryogenic fluid to the downstream process; and regulating an amount of the combined liquid and gas phases of the cryogenic fluid supplied to said downstream process based upon the setpoint amount of cooling energy and the calculated energy flow rates associated with the measured gas and liquid phases mass flow rates.

\* \* \* \* \*